United States Patent [19]

McKinnie, III et al.

[11] 4,396,326

[45] Aug. 2, 1983

[54] SELF SEALING J NUT

[75] Inventors: Wm. Michael McKinnie, III, Dearborn; Chester Sokol, Allen Park, both of Mich.

[73] Assignee: Ford Motor Company, Dearborn, Mich.

[21] Appl. No.: 202,399

[22] Filed: Oct. 30, 1980

[51] Int. Cl.³ .............................................. F16B 37/04
[52] U.S. Cl. ..................................... 411/103; 411/175
[58] Field of Search ............... 411/103, 112, 111, 175, 411/174, 173, 172, 427, 542, 104

[56] References Cited

U.S. PATENT DOCUMENTS 2,904,820  9/1959  Flora ............................... 411/176 X
3,229,743  1/1966  Derby .................................. 411/175
3,264,699  8/1966  Knowlton ........................ 411/526 X
3,426,818  2/1969  Derby .................................. 411/175
4,219,064  8/1980  Lozano ................................ 411/103
4,243,086  1/1981  Kuttler et al. ...................... 411/174

Primary Examiner—Ramon S. Britts
Attorney, Agent, or Firm—Peter D. McDermott; Roger L. May

[57] ABSTRACT

FIG. 1 shows fastener, sealer member 100 mounted to fastening member 102 through access opening 106. Fastener sealer member 100 has flap member 300 mounted to unitary fastener member 200 seals fastening opening 104; flap 300 with areas 302 and 304 seals access opening 106.

13 Claims, 3 Drawing Figures

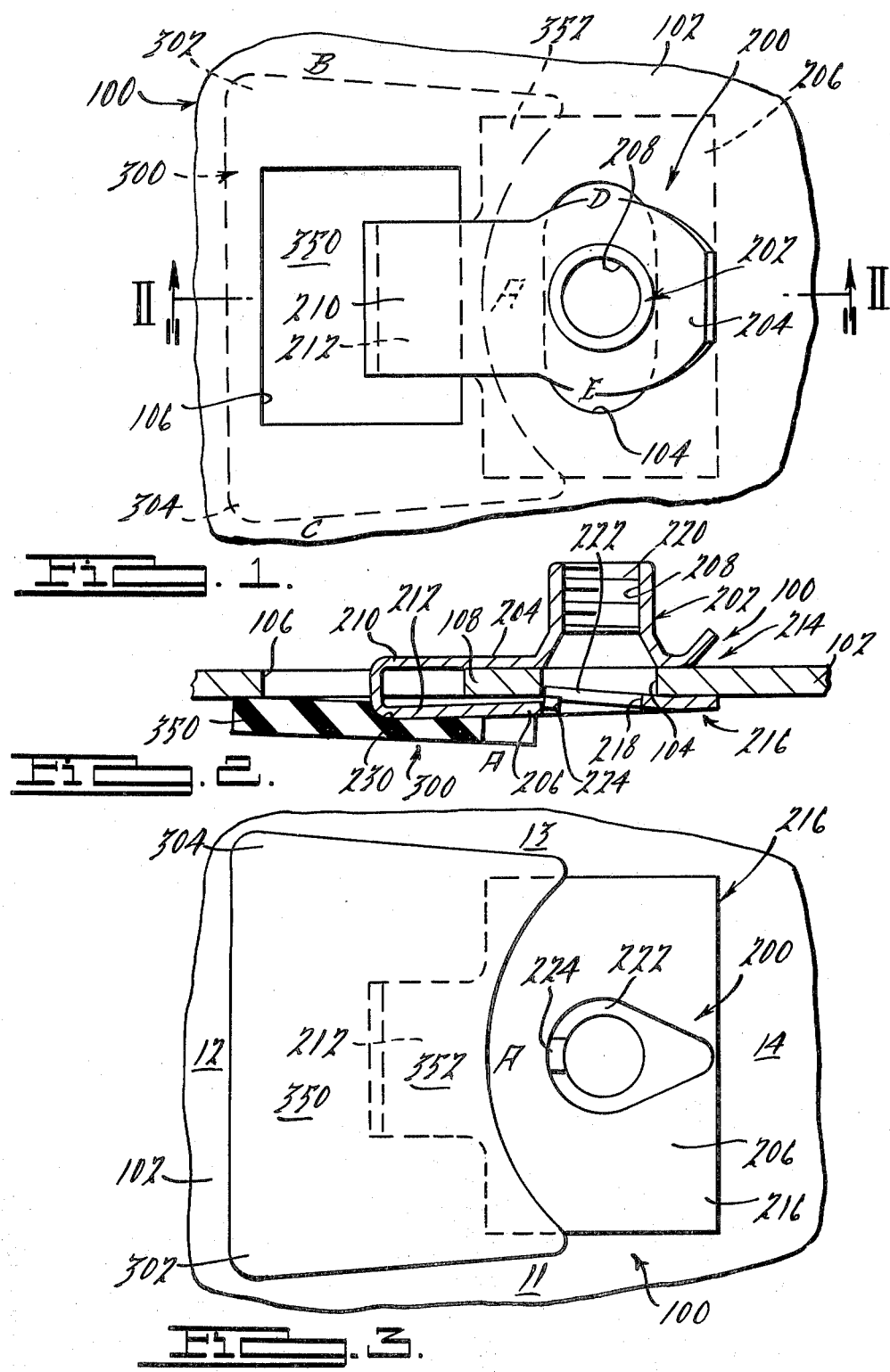

SELF SEALING J NUT

BACKGROUND OF THE INVENTION

This invention relates to improved j-nut fastener members and fastening methods. The improved fastener members have an outboard flap; the improved fastening methods utilize fastening members with such a flap.

So-called j-nut fastening members are very well known. Known, also, is use of such a fastening members to fasten a first sheet-like fastenable member to a second member at an isolated fastening opening of the first.

A fastening opening of a fastenable member is isolated if, for instance, shape or distance prevents or otherwise inhibits sliding of free ends of a j-nut member along respective sides of the fastenable member from an exterior edge to the fastening opening. A flange or other obstructive geometry of a fastenable member, for example, may isolate a fastening opening of the fastenable member. Similarly, obstructive or other geometry of a first fastenable member may contribute to isolation of a fastening opening of a second fastenable member, for example, if such geometry interferes with proper alignment of the j-nut and fastening openings.

Even if a first fastenable member has a fastening opening which is not isolated, fastening expedience, e.g., ease of insertion of the j-nut bolt, may dictate use of a j-nut at an isolated fastening opening of the second member.

When a fastenable member has an isolated fastening opening, use of a j-nut calls also for an access opening in the fastenable member. The free ends of the j-nut then may respectively slide from an edge of the access opening adjacent the fastening opening to the fastening opening.

The access and fastening openings typically are larger than strictly required for fastening; the larger openings facilitate operative engagement of a j-nut member and adjustments of the fastenable members thereafter during fastening.

The larger openings, of course, open an even greater amount of a fastenable member. The greater amount of opening may prevent after fastening sealing engagement by the other fastenable member, especially when the other member has a geometry which does not correspond to the geometry around the fastening and access openings of the first member.

It is an object of this invention to provide fascile means and methods for fastening a first fastenable member to a second at an isolated, fastening opening of the first in a manner that seals an access opening of the first fastenable member.

It is an additional object of this invention to provide a fastener member which fastens first and second fastenable members and acts as a seal.

These and other objects are accomplished as will be evident from the hereinafter disclosure.

SUMMARY OF THE INVENTION

This invention relates to an article of manufacture for fastening a first fastenable member to a second at an isolated position of the first. The articles comprise: a first fastener member of an elongated, generally U-shaped configuration and having first and second prongs (i) integrated together at respective first curved ends to form a rearward portion of the U-shaped configuration and (ii) perforated at respective second, free ends, forward of the rearward portion, for permitting operative engagement of a second fastener member to means to secure the second fastener member carried by the first fastener member; and a sealing member carried by the first prong and having a flap portion (i) comprising a flap adapted to extend rearward of the rearward curved portion and (ii) having a width dimension, measured in a direction perpendicular to the long axis of the first fastener member, that exceeds a correspondingly measured width dimension of the second prong.

Articles of this invention may also be characterized as comprising: a first fastener member of an elongated, generally U-shaped configuration and having first and second prongs (i) integrated together at respective first curved ends to form a rearward portion of the U-shaped configuration and (ii) perforated at respective second, free ends, forward of the rearward portion, for permitting operative engagement a second fastener member at means to secure the second fastener member carried by the second prong; a sealing member mounted on a surface portion of the first prong opposite the second prong and having a flap portion (i) comprising a relatively thin flap adapted to extend rearward of the rearward portion and (ii) having a width dimension, measured in a direction perpendicular to the long axis of the first fastener member, that exceeds a correspondingly measured width dimension of the second prong.

In its method aspect, this invention comprises a method of fastening a first fastenable member to a second at an isolated fastening location of the first fastenable member and seal the first fastenable member. The method comprises: providing a fastening opening in the first fastenable member at the isolated location; providing an access opening in the first fastenable member adjacent the fastening opening so that a first member portion of the first fastenable member is between the fastening and access openings; providing a fastening and sealing means comprising: a first fastenable member of an elongated, generally U-shaped configuration and having first and second prongs (i) integrated with one another at respective first curved ends to from a rearward portion of said U-shaped configuration and (ii) perforated at respective second, free ends, forward of the rearward portion, for permitting operative engagement of a second fastener member at means to secure the second fastener member carried by the first fastener member; a sealing member mounted to the first prong and having a flap portion (i) comprising a relatively thin flap adapted to extend rearward of the rearward portion and (ii) having a width dimension, measured in a direction perpendicular to the long axis of the first fastener member, that exceeds a correspondingly measured dimension of the second prong; inserting said second prong into said access opening; sliding the first and second prongs on either side of the first member from an edge of the access opening adjacent the fastening opening along the first member portion so as to permit openings in the first ends of the first fastener member to align with the fastening opening of the first member and a portion of the flap portion of the sealing member to cover the access opening.

BRIEF DESCRIPTION OF THE DRAWINGS

FIG. 1 shows fastener, sealer member 100 mounted to fastenable sheet member 102 from a first side of member 102.

FIG. 2 shows a section looking in from A—A of FIG. 1.

FIG. 3 shows fastener, sealer member 100 mounted to fastenable member 102 from the opposite side of sheet member 102 shown in FIG. 1.

DETAILED DESCRIPTION OF PREFERRED EMBODIMENTS

Fastener, sealer member 100 of FIGS. 1, 2 and 3 enables fastening of fastenable member 102 at isolated, oblong fastening opening 104 to another fastenable member (not shown) with aid of rectilinear access opening 106. Fastenable member 102 and the other fastenable member may comprise, for example, a sheet or other relatively thin section of metal or plastic.

The aforementioned other fastenable member engages member 102 at the side of member 102 identified by the letter A. When fastened, the other fastenable member does not completely engage fastenable member 102; rather, it has a geometry that is relatively flat at its fastening opening but curved or non-existent at areas that engage access opening 106.

Fastenable member 102 has an isolated fastening location, because edges around fastenable member 102 (broken away at 12, 13 and 14 of FIG. 3) are a greater distance from fastening opening 104 than the distance from a point between curved ends 210 and 212 and opening 218. Also, portions of member 102 between these edges and fastening opening 104 are highly contoured. Edge of member 102 (broken away at 11 in FIG. 3) has a flange (not shown).

Fastener, sealer member 100 of FIGS. 1, 2 and 3 comprises flap member 300. Flap member 300 is preferably made of elastomer such as polyvinylchloride or polyurethane.

The elastomer preferably has a durometer of between 40–100, e.g. 60. Unitary, metal fastener member 200 carries flap member 300. Flap member 300 mounts to fastener member 200 at recess 230 of flap member 300.

As can be seen from FIG. 1, flap member 300 has a width (B-C) that exceeds width (D-E) of prong 204. In making fastener, sealer member 100, fastener member 200, made by usual technique in making j-nuts from sheet metal, is positioned over a cavity the size of flap member 300. Molten elastomer, e.g. a plastisol, fills the cavity; upon curing or otherwise harding, it bonds flap member 300 to fastener member 200 at areas of contact between them, i.e. recess 230 of flap member 300. In making fastener, sealer member 100, fastener member 200 has been tipped slightly over the cavity, e.g. about 1°–20° relative to the cavity. Thus, end portion 212 of prong 206 embeds deeper into recess 230 than other embedded portions forward of end 212, as can be seen from FIG. 2.

As seen from FIGS. 1, 2 and 3, fastener, sealer member 100 comprises an elongated U-shaped cross section configuration with flap portion 350 extending rearward from the U-shaped configuration of fastener member 200. Prongs 204 and 206 of the U-shaped configurated blend together at respective first ends 210 and 212. Prong 204 has free, second end 214 which carries integral securing means 202, a threaded socket, for a second fastener member e.g., bolt (not shown). The second fastener member threads to threads 220 around the periphery of opening 208.

Prong 206 has free, second end 216. Free, second end 216 has opening 218 through which the second fastener member, e.g. a bolt (not shown), may pass. Tong member 222 surrounds opening 218. Tong member 222 has curved tip 224. Tong member 222 with tip 224 serves to maintain fastener, sealer member 100 at fastening opening 104 of fastenable member 100. Once fastener, sealer member 100 mounts to fastenable member 102, curved tip 224 acts as a stop against portion 108 of member 102 adjacent opening 104.

Fastener, sealer member 100 mounts to fastenable member 102 as would any other similarly configured j-nut fastening means. Free ends 214 and 216 of respective prongs 204 and 206 slide on either side of member 102 from an edge of portion 108 adajacent access opening 106 to fastening opening 104. Openings 104 and 106 are large enough to permit alignments of fastening opening 104 and openings 208 and 218 at various positions of fastenable member 102. Sealing member 300 has areas 302 and 304 to insure that it covers opening 106 in all such alignments. Thus, for example, areas 302 and 304 insure coverage of access opening 106 in case of rotation of member 100 by torque of the second fastener member.

In the embodiment of FIGS. 1, 2 and 3 sealing member 300 has first and second portions. When fastener, sealer member 100 mounts to fastenable member 102, flap portion 350 of member 300 covers access opening 106. Mounting portion 352 remains mounted to prong 206. Flap portion 350 extends rearwardly away from rearward end 212 of prong 206. In the embodiment shown, flap portion 350 tips toward fastenable member 102; it is partially in a plane that extends from prong 206 to a location in a second plane between prongs 204 and 206; the second plane intersects the curved rearward portion of member 200.

In other versions of this invention depicted in FIGS. 1, 2 and 3, flap portion 350 may extend from prong 206 parallel to a plane between prongs 204 and 206 that bisects the rearward portion of member 200. In these other versions, the other fastening member (not shown) urges member 300 toward access opening 106.

In an alternative embodiment, a member as sealing member 300 mounts to prong 204 at end 210 in a manner similar to the way sealing member 300 mounts to prong 206. In this embodiment, a prong such as 204 has an end with dimensions that exceed dimensions of the fastening opening; a prong such as 206 has dimensions permitting its entry into the access opening.

The former embodiment (depicted in FIGS. 1, 2 and 3) permits fastening in an automotive manufacturing context. Thus sealing, fastener member 100 permits attachment of a rear portion of a front fender assembly to a front portion of a rocker panel; it, also seals the front portion of the rocker panel. The seal reduces passenger compartment noise and ventilation significantly otherwise permitted by the access and fastening openings.

What is claimed is:

1. A article of manufacture, which comprises:
a first fastener member of an elongated, generally U-shaped configuration and having first and second prongs (i) integrated together at respective first curved ends to form a rearward portion of said U-shaped configuration and (ii) perforated at respective second, free ends, forward of said rearward portion, for permitting operative engagement of a second fastener member to means to secure said second fastener member carried by said first fastener member and; a sealing member carried by said first prong and having a flap portion (i) comprising a flap extending rearward a substantial distance of said rearward portion and (ii) having a width dimension, measured in a direction perpendicular to the long axis of said first fastener member, that exceeds a so measured width dimension of said second prong.

2. An article in accordance with claim 1, wherein said first fastener carries said sealing member on a surface portion of said first prong opposite said second prong.

3. An article in accordance with claim 2, wherein said flap portion has a plane that tips toward said second prong.

4. An article in accordance with claims 1, 2 or 3, wherein said flap portion comprises an elastomer.

5. An article in accordance with claim 4, wherein said sealing member has a recess conforming to a surface portion of said first prong.

6. An article in accordance with claim 5, wherein said first fastener member is unitary.

7. An article of manufacture for fastening a first fastenable member to a second at an isolated fastening opening of said first, which comprises:
  a first fastener member of an elongated, generally U-shaped configuration and having first and second prongs (i) integrated together at respective first curved ends to form a rearward portion of said U-shaped configuration and (ii) perforated at respective second, free ends, forward of said rearward portion, for operatively engaging a second fastener member at means to secure said second fastener member carried by said second prong and;
  a sealing member mounted on a surface portion of said first prong opposite said second prong and having a flap portion (i) comprising a relatively thin flap extending rearward a substantial distance of said rearward portion and (ii) having a width dimension, measured in a direction perpendicular to the long axis of said first fastener member, that exceeds a so measured width dimension of said second prong.

8. An article in accordance with claim 7, wherein said sealing member comprises an elastomer.

9. An article in accordance with claim 8, wherein said elastomer tips from said first prong toward said second prong.

10. An article in accordance with claim 8, wherein said elastomer comprises polyvinylchloride.

11. An article in accordance with claim 7, 8, 9 or 10, wherein said first end of said first prong has a width dimension, measured perpendicular to the long axis of said first fastener, that exceeds a correspondingly measured dimension of said fastening opening.

12. An article in accordance with claim 11, wherein said flap portion of said sealing member has a recess conforming to a surface portion of said first prong.

13. An article in accordance with claim 12, wherein a rearward portion of said flap portion of said sealing member has a location in a plane that (i) intersects said rearward curved portion and (ii) is between said first and second prongs.

* * * * *